United States Patent Office 3,507,351
Patented Apr. 21, 1970

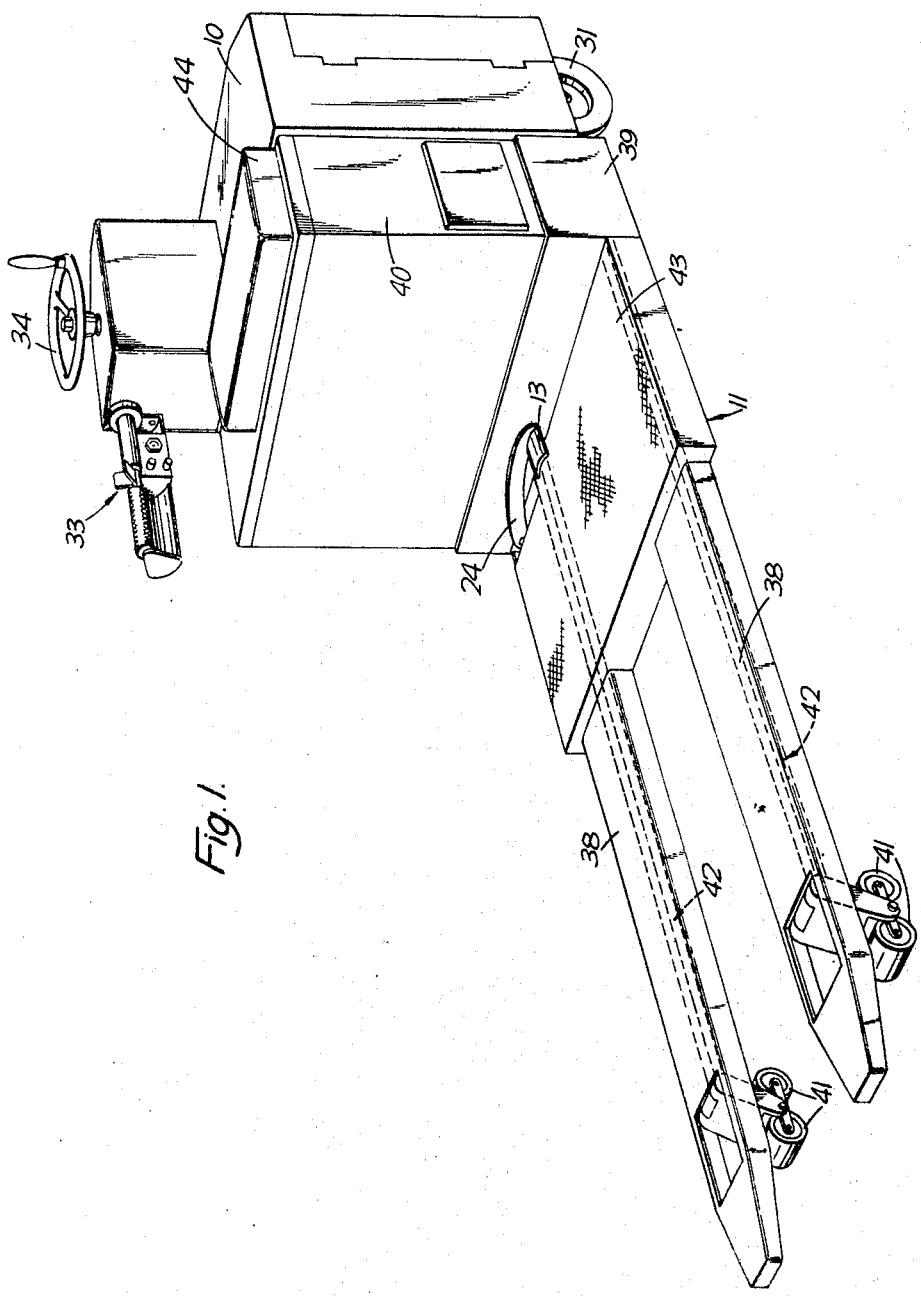

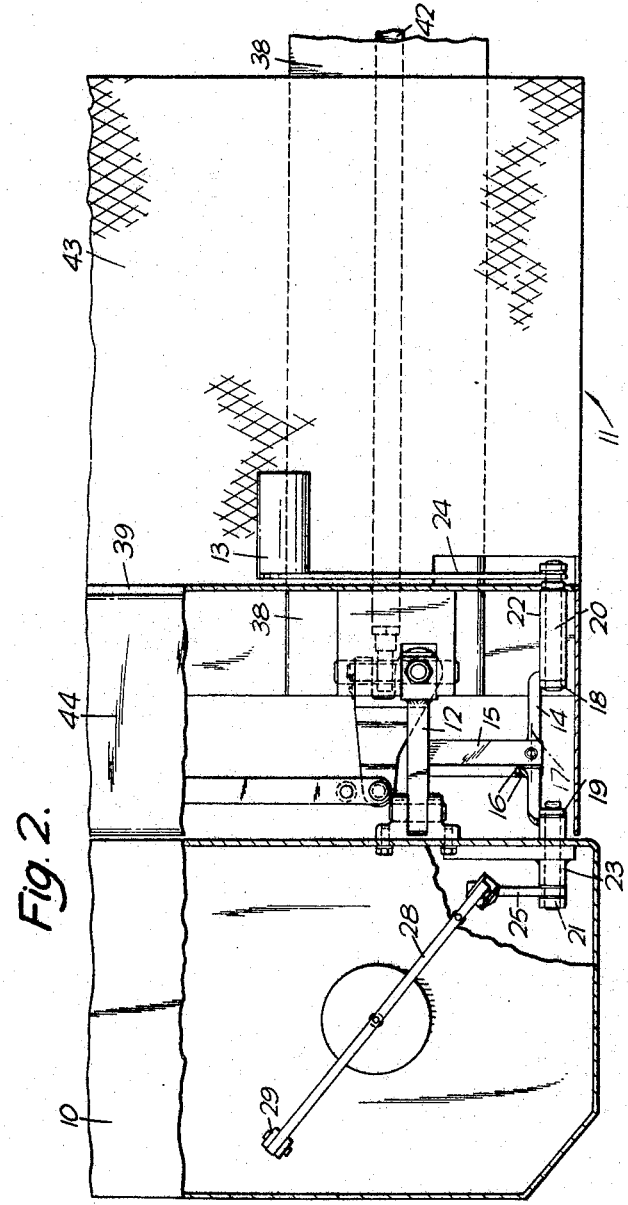

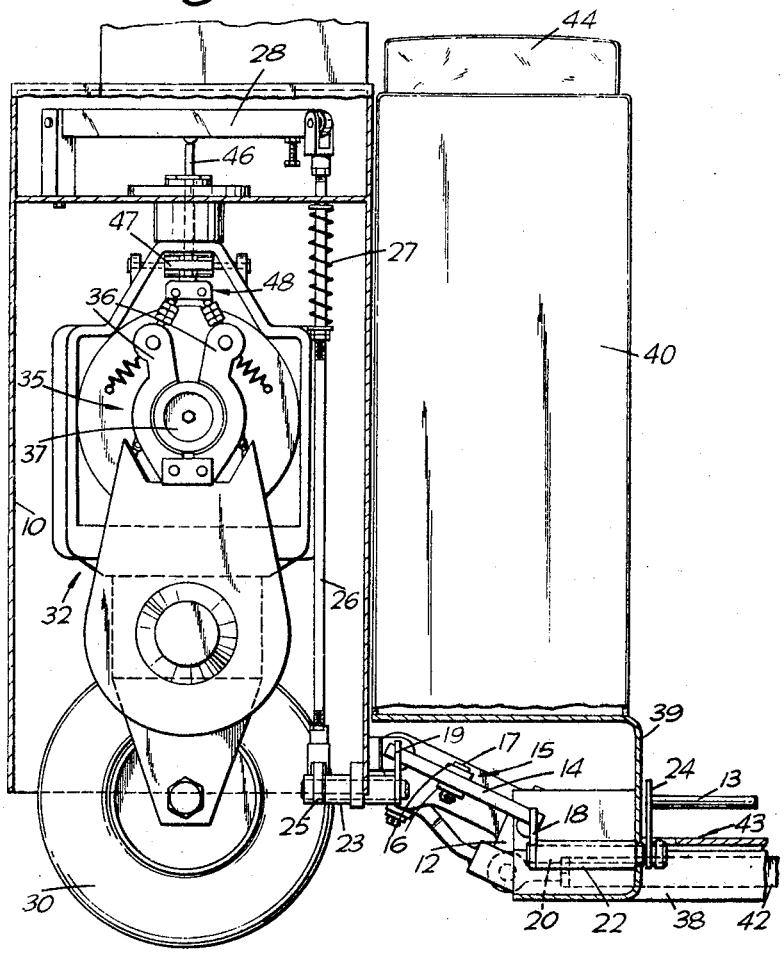

3,507,351
CONTROL MECHANISM FOR PALLET OR STILLAGE TRUCKS
Cecil Goodacre, Basingstoke, England, assignor to Lansing Bagnall Limited, Basingstoke, Hampshire, England, a British company
Filed May 29, 1968, Ser. No. 733,068
Claims priority, application Great Britain, June 2, 1967, 25,661/67
Int. Cl. B60l *15/42;* B60r *21/00*
U.S. Cl. 180—101          6 Claims

ABSTRACT OF THE DISCLOSURE

An industrial pallet or stillage truck has a body portion, a fork or load platform structure projecting forwardly from the body portion, an operator platform movable up and down with the fork or load platform structure and a control mechanism (e.g. a dead-man brake mechanism) on the body portion for operation by a pedal on the operator platform, the pedal being connected to the control mechanism by a linkage which is unaffected by up and down movement of the fork or load platform structure and hence of the operator platform relatively to the body portion.

---

This invention relates to industrial pallet or stillage trucks of the kind which comprise a body portion housing a power unit for driving a ground wheel, a forwardly projecting fork or load platform structure supported at its outer end by wheeled ground supports and a linkage for each wheeled ground support to raise and lower the outer end of the fork or load platform structure relatively to the wheeled ground supports when the root portion is raised or lowered. This linkage for each ground support includes a lever which at one end is pivotally attached to the body portion of the truck and at the other end is pivotally attached to the root portion of the fork or load platform structure. The said other end of this lever is thereby lowered and raised together with the root portion of the fork or load platform structure.

In trucks of this kind, it is known to provide a dead-man brake mechanism, for example a pair of brake shoes capable of movement into and out of engagement with the external surface of a brake drum mounted on the drive shaft of the power unit, which mechanism is operable by a linkage connected to a driving handle, or a pedal in the case of a truck having an operator platform from which the operator can operate the truck. Furthermore, in the latter kind of truck, it has been proposed that the speed controller for the power unit should be operated by a foot pedal mounted on the operator platform and connected by a linkage to the controller.

Normally, a truck of the above kind having an operator platform, would be provided with its operator platform on the back end of the body portion, i.e. the end which is remote from the fork or load platform structure, the operator platform being a part of the body portion and being unaffected by up and down movement of the fork or load platform structure relative to the body portion.

On the other hand the present invention is concerned with a construction of pallet or stillage truck which has an operator platform mounted in fixed relation with the root end of the fork or load platform structure in order that the operator should be positioned on the fork or load platform structure side of the driving means, batteries etc., thereby easing the work of filling or emptying a pallet or stillage, i.e. so that the operator may use the truck as an order-picker truck. However, a transmission problem arises from the fact that any pedal designed for operation by the operator whilst he is on the operator platform will move up and down with the operator platform relative to the brake and/or driving mechanism.

The object of this invention is to provide a linkage between such a pedal and the mechanism it controls which allows relative movement between the pedal and the mechanism with the minimum amount of adjustment or attention during service.

According to the invention and industrial pallet or stillage truck comprising a body portion housing a power unit for driving a ground wheel, a forwardly projecting fork or load platform structure supported at its outer end by wheeled ground supports, a linkage for each wheeled ground support to raise and lower the outer end of the fork or load platform structure relatively to the wheeled ground supports when the root portion is raised or lowered, the said linkage for each ground support including a lever which at one end is pivotally attached to the body portion of the truck and at the other end is pivotally attached to the root portion of the fork or load platform structure, the said other end of this lever thereby being lowered and raised together with the root portion of the fork or load platform structure, and a control mechanism on the body portion of the truck, is characterized by an operator platform movable up and down with the root portion of the fork or load platform structure, and by a second linkage connecting a pedal, operable from the operator platform and movable up and down therewith, and the aforesaid control mechanism on the body portion of the truck, the said second linkage including a link mounted in parallel spaced relation with the said lever of one of the first-mentioned linkages for movement therewith during up and down movement of the root end of the fork or load platform structure and for pivotal movement independently of the said lever and in a direction which is transverse to the length of the link, said pivotal movement of the link effecting operation of the control mechanism.

Preferably the control mechanism is a dead-man brake mechanism, the said second linkage being such that depression of the said pedal disengages the brake mechanism.

It is also preferred that the said levers of the said first-mentioned linkages and the said link of the said second linkage extend longitudinally of the truck, the pedal is operatively connected to the front end of the link and the other end of the link is operatively connected to the control mechanism. Preferably the two connections are on the pivot axes of the two ends of the lever associated with the said link.

A specific embodiment constructed in accordance with the invention will now be described, by way of example and with reference to the accompanying drawings in which:

FIGURE 1 is a perspective view of a pallet truck having an operator platform movable with the root end of the fork structure of the truck, and a dead-man brake linkage which is unaffected by up and down movement of the operator platform;

FIGURE 2 is a plan view of a part of the truck shown in FIGURE 1, part cut-away to show the brake linkage;

FIGURE 3 is a side elevation of a part of the truck shown in FIGURE 1, the truck again being part cut-away to show the brake linkage.

With reference to the drawings, the pallet truck comprises a body portion 10 supported by a steerable driven wheel 30 and a caster wheel 31. The wheel 30 is part of a well-known power unit 32 provided with an electric motor controlled by hand-operated direction and speed controls 33, a steering wheel 34 and a drum brake mechanism 35. The brake mechanism is of the dead-man type in which depression of a pedal 13 by the operator disengages the brake shoes 36 from the drum 37 of the brake mechanism.

Projecting forwardly from the body portion, is a fork structure 11 comprising two parallel forks 38 joined by a root portion 39 which root portion carriers a battery casing 40 housing the truck storage batteries. This root portion 39 of the fork structure is movable up and down relatively to the body portion by means of a jack (not shown). The forks are also supported at their outer ends by wheels 41 operated by linkages 42 for allowing relative movement between the wheels and the said outer ends of the forks when the root portion 39 is raised or lowered. The forks are thus kept horizontal. These linkages are fully described in the specification of U.S. Patent No. 3,352,569. It is therefore sufficient to state that the linkage for each set of wheels 41 includes a lever 12 which at its rear end is pivotally attached to the body portion of the truck and at its front end is pivotally attached to the root portion of the fork structure, the said other end thereby being lowered and raised together with the root portion of the fork structure.

Mounted on the forks 38, in front of the battery casing 40, there is provided an operator platform 43. The operator may drive the truck either when standing on this platform 43 or when sitting on a seat pad 44 provided on top of the battery casing. Projecting upwardly through the operator platform is the above-mentioned pedal 13 for operating the dead-man brake. The linkage between this pedal 13 and the brake shoes 36 will now be described.

The main part of this linkage is a link 14 which passes between the forked arms 16 of a bar 15 connecting the link 14 to the lever 12 of one of the linkages 42, the link 14 and the lever 12 being in parallel spaced relation. This link 14 is thereby moved by the lever 12 and in unison therewith during up and down movement of the root portion of the fork structure and hence during up and down movement of the operator platform and the brake pedal. The link is also pivotally mounted within the forked arms 16 of the bar 15, about the axis 17. At each end of the link 14, there is a vertical lever 18, 19 the levers 18, 19 being engaged by the surface of the link 14 which is furthest from the lever 12, the central points of contact between the link 14 and the levers 18, 19 being located on the pivotal axes of the respective ends of the lever 12. Thus pivotal movement of the link 14 caused by the lever 18, will effect outward movement (as viewed in FIGURE 2) of the lever 19. The levers 18, 19 are also fixed to spindles 20, 21 extending lengthwise of the truck and mounted for rotation in bearings 22, 23 respectively, the bearing 23 being fixed to the body portion 10 of the truck and the bearing 22 being fixed to the root portion 39 of the fork structure. The spindles 20, 21 also carry horizontal levers 24, 25 respectively. The lever 24 is directly connected to the brake pedal 13 and the lever 25 is connected to the brake shoes 36 by means of a vertical rod 26 which is spring-urged downwardly by a spring 27, and a linkage whereby upward movement of the rod 26 effects release of the brake shoes from the brake drum, which linkage includes a horizontal lever 28 connected at one end to the upper end of the rod 26 and pivoted at its other end 29 about a horizontal axis. At the centre of this lever 28 there is a downwardly extending projection 45 for engagement with the upper end of a vertical rod 46. The lower end of the rod 46 engages one end of a lever 47 which is mounted on the casing of the power unit 32 for pivotal movement about a horizontal axis. The other end of this lever 47 is attached to the upper end of a Y-shaped spring-actuated mechanism 48 connected to the brake shoes 36 of the brake 35, whereby upward movement of the rod 46 will effect disengagement of the brake shoes 36 from the brake drum 37.

Thus, in operation, depression of the dead-man brake pedal 13 by the operator lowers the lever 24 and rotates the lever 18 towards the link 14. The link 14 thereby pivots about the axis 17 and rotates the lever 19 in a direction away from the lever 12. The spindle 21 will thereby be rotated and the lever 25 will be raised, the lever in turn raising the rod 26 and the associated end of the substantially horizontal lever 28. The vertical rod 46 may thus move upwardly under pressure of the springs of the mechanism 48, hence allowing the mechanism 48 to disengage the brake shoes of the brake mechanism 35. By virtue of the spring 27, removal of the operator's foot from the pedal 13 will effect re-engagement of the brake shoes 36 with the drum 37.

It will be appreciated that with the above construction and by reason of the symmetry of the lever and link mechanism, operation of the brake mechanism 35 and the position of the pedal 13 relative to the operator platform 43 will not be affected by up and down movement of the platform.

It will also be appreciated that the invention is not restricted to the specific details of the truck described above. For example, the pedal 13 on the operator platform may comprise an accelerator pedal, in which case the linkage connected thereto is employed to connect the accelerator pedal to the regulating means for controlling the power unit 32 for the ground wheel 30. Alternatively, the truck may be provided with a brake pedal and associated linkage mounted on one of the levers 12 and an accelerator pedal and associated linkage mounted on the other lever 12, there being two levers 12 one associated with each fork 38.

The forks 38 may also be replaced by a load platform.

I claim:

1. An industrial pallet or stillage truck comprising a body portion housing a power unit for driving a ground wheel, a forwardly projecting fork or load platform structure supported at its outer end by wheeled ground supports, a linkage for each wheeled ground support to raise and lower the outer end of the fork or load platform structure relatively to the wheeled ground supports when the root portion is raised or lowered, the said linkage for each ground support including a lever which at one end is pivotally attached to the body portion of the truck and at the other end is pivotally attached to the root portion of the fork or load platform structure, the said other end of this lever thereby being lowered and raised together with the root portion of the fork or load platform structure, and a control mechanism on the body portion of the truck, characterised by an operator platform movable up and down with the root portion of the fork or load platform structure, and by a second linkage connecting a pedal, operable from the operator platform and movable up and down therewith, and the aforesaid control mechanism on the body portion of the truck, the said second linkage including a link mounted in parallel spaced relation with the said lever of one of the first-mentioned linkages for movement therewith during up and down movement of the root end of the fork or load platform structure and for pivotal movement independently of the said lever and in a direction which is transverse to the length of the link, said pivotal movement of the link effecting operation of the control mechanism.

2. A truck as claimed in claim 1 in which the control mechanism is a dead-man brake mechanism, the said second linkage being such that depression of the said pedal disengages the brake mechanism.

3. A truck as claimed in claim 1 in which the said levers of the said first-mentioned linkages and the said link of the said second linkage extend longitudinally of the truck, the pedal is operatively connected to the front end of the link and the other end of the link is operatively connected to the control mechanism.

4. A truck as claimed in claim 3 in which the two connections are on the pivot axes of the two ends of the lever associated with the said link.

5. A truck as claimed in claim 1 in which there are two control mechanisms on the body portion of the truck, each control mechanism being connected to a pedal operable from the operator platform as aforesaid, there being two said second linkages including links mounted in parallel spaced relation with the levers of the first-mentioned linkages respectively.

6. A truck as claimed in claim 5 in which one of the control mechanisms is a dead-man brake mechanism and in which the other control mechanism is a direction and/or speed control for the power unit.

References Cited

UNITED STATES PATENTS

| | | |
|---|---|---|
| 3,016,973 | 1/1962 | Williamson. |
| 3,187,829 | 6/1965 | Ulinski _____ 188—166 X |
| 3,224,529 | 12/1965 | Gandolfo _____ 187—9 X |

KENNETH H. BETTS, Primary Examiner

U.S. Cl. X.R.

187—9; 182—15, 114; 188—166